(12) United States Patent
Hayashida

(10) Patent No.: US 9,253,625 B2
(45) Date of Patent: Feb. 2, 2016

(54) INFORMATION MANAGEMENT APPARATUS, INFORMATION MANAGEMENT METHOD, AND INFORMATION MANAGEMENT PROGRAM

(75) Inventor: Naoko Hayashida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 13/368,863

(22) Filed: Feb. 8, 2012

(65) Prior Publication Data

US 2012/0136982 A1 May 31, 2012

Related U.S. Application Data

(63) Continuation of application No. PCT/JP2009/064465, filed on Aug. 18, 2009.

(51) Int. Cl.
*G06F 15/173* (2006.01)
*H04W 8/22* (2009.01)
*H04W 4/00* (2009.01)
*H04W 4/02* (2009.01)

(52) U.S. Cl.
CPC ............... *H04W 8/22* (2013.01); *H04W 4/001* (2013.01); *H04W 4/021* (2013.01)

(58) Field of Classification Search
CPC ..................................................... H04L 63/20
USPC ............................................... 709/223, 224
See application file for complete search history.

(56) References Cited

U.S. PATENT DOCUMENTS

| 7,624,421 B2 * | 11/2009 | Ozzie et al. ........................ 726/1 |
| 2003/0083012 A1 * | 5/2003 | Iwasaki ........................... 455/41 |
| 2007/0203937 A1 * | 8/2007 | Prahlad et al. ................. 707/102 |
| 2008/0052384 A1 * | 2/2008 | Marl et al. ..................... 709/223 |
| 2009/0203370 A1 * | 8/2009 | Giles et al. .................... 455/418 |

FOREIGN PATENT DOCUMENTS

| CN | 1832494 | 9/2006 |
| JP | 2003-4879 | 1/2003 |
| JP | 2003-143052 | 5/2003 |
| JP | 2007-325158 | 12/2007 |

OTHER PUBLICATIONS

International Search Report of PCT/JP2009/064465 mailed Sep. 29, 2009.
Chinese Office Action issued Nov. 25, 2013 in corresponding Chinese Patent Application No. 200980160976.2.
Chinese Decision of Rejection issued Mar. 30, 2015 in corresponding Chinese Patent Application No. 200980160976.2.

* cited by examiner

*Primary Examiner* — Wing F Chan
*Assistant Examiner* — Andrew Woo
(74) *Attorney, Agent, or Firm* — Staas & Halsey LLP

(57) ABSTRACT

An information management unit 12 of an information management apparatus 1 represents a device as an object by a service provided and data stored in the apparatus. The information management unit 12 further sends and receives an object by a communication unit 23 and manages a surrounding apparatus as a similarly modeled object. A device policy creating unit 24 defines from objects what kind of device state is desirable when the surrounding environment is constituted by a plurality of devices in particular states as a device policy, and changes a setting of the information management apparatus 1 according to the device policy.

6 Claims, 14 Drawing Sheets

FIG.14

```
<?xml version="1.0" encoding="UTF-8" standalone="no"?>
<ics:Icsdata xmlns: ics="http://ics.aaa.co.jp/c1/icsdat">
  <ics:ObjectdataSet>
    ·· OBJECT DEFINITION ··     ~D11
  </ics:ObjectdataSet>
  <ics:PolicySet>                                          D12
    ··DEVICE POLICY SETTING: POLICY APPLYING OBJECT AND ITS CONTENT
  </ics:PolicySet>
</ics:Icsdata>
```

OBJECT DEFINITION D11

```
<ics:ObjectdataSet>
<ics:Objectdata id="" name="dev-CELPN-F-F01A-#num" stop="">
<ics:Comment>
CELLULAR PHONE MADE BY aaa COMPANY
</ics:Comment>
<ics:ObjectPropertySet>
 ... OBJECT PROPERTY DEFINITION ...
</ics:ObjectPropertySet>
<ics:ObjectServiceSet>
 ... OBJECT SERVICE DEFINITION ...
</ics:ObjectServiceSet>
</ics:Objectdata>
<ics:Objectdata>
...
</ics:Objectdata>
</ics:ObjectdataSet>
```

OBJECT PROPERTY DEFINITION

```
<ics:ObjectPropertySet>
<ics:ObjectProperty name="PRODUCT NAME" value="CELLULAR PHONE" />
<ics:ObjectProperty name="MODEL NUMBER" value="F-01A" />
<ics:ObjectProperty name="MANUFACTURER" value="aaa" />
<ics:ObjectProperty name="OBJECT GROUP" value="ICS-aaa" />
...
</ics:ObjectPropertySet>
```

OBJECT SERVICE DEFINITION

```
<ics:ObjectServiceSet>
<ics:ObjectService type="relation" name="near" url="System.Ics.def.relation.near" permit ="500">
 <ics:ObjectServiceParameterSet>
  <ics:ObjectServiceParameter dir="in" type="oid" name="O" />
  <ics:ObjectServiceParameter dir="out" type="boolean" name="result" />
 </ics:ObjectServiceParameterSet>
</ics:ObjectService>
<ics:ObjectService type="DEVICE INFORMATION SETTING" name="SOUND SETTING" permit="666" url="System.Dev.Sound">
 <ics:ObjectServiceData name="RING SETTING ON/OFF" value="ON" />
</ics:ObjectService>
<ics:ObjectService type="DATA SETTING" name="ADDRESS BOOK" permit="620" url="System.Pbook" />
<ics:ObjectService type="FILE MANAGEMENT" name="FILE SHARE" permit="660" url="System.Net.Fileshare">
 <ics:ObjectServiceParameterSet>
  <ics:ObjectServiceParameter dir="in" type="url" name="sfile" />
  <ics:ObjectServiceParameter dir="out" type="oid" name="fid" />
 </ics:ObjectServiceParameterSet>
</ics:ObjectService>
<ics:ObjectService type="DATA COMMUNICATION" name="INFRARED" url="System.Comm.Irda" auth="preauthonthedevice" permit="550" />
...
</ics:ObjectServiceSet>
```

FIG.16

DEVICE POLICY SETTING

D12

```
<ics:PolicySet>
<ics:Policy>
<ics:TargetobjectpolicySet>
  ... SPECIFY OBJECT SERVICE FOR WHICH POLICY IS SET AND ITS
DATA ...
</ics:TargetobjectpolicySet>
<ics:TargetobjectSet>
  ... SPECIFY OBJECT TO WHICH POLICY SETTING IS APPLIED ...
</ics:TargetobjectSet>
</ics:Policy>
...
</ics:PolicySet>
```

SPECIFY OBJECT SERVICE FOR WHICH POLICY IS SET AND ITS DATA

```
<ics:TargetobjectpolicySet>
<ics:Targetobjectpolicy>
  <ics:ObjectService type="DEVICE INFORMATION SETTING" name="SOUND SETTING">
    <ics:ObjectServiceData name="RING SETTING ON/OFF" value="OFF" />
  </ics:ObjectService>
</ics:Targetobjectpolicy>
...
</ics:TargetobjectpolicySet>
```

SPECIFY OBJECT TO WHICH POLICY SETTING IS APPLIED

```
<ics:TargetobjectSet>
<ics:Targetobject id="" name="dev-CELPN-F-F01A-#num">
  <ics:Targetplace>
    <pi codeSpace="ics_bld.pi.b.aaa.co.jp">
    b LABORATORY.1F.c HALL
    </pi>
  </ics:Targetplace>
  <ics:RelatedObject relation="near" minnumber="3">
    <ics:RelatedObjectService type="DEVICE INFORMATION SETTING" name=
    "SOUND SETTING" >
      <ics:RelatedObjectServiceData name="RING SETTING ON/OFF" value="OFF">
    </ics:RelatedObjectService>
  </ics:RelatedObject>
</ics:Targetobject>
...
</ics:TargetobjectSet>
```

FIG. 17

SPECIFY OBJECT SERVICE FOR WHICH POLICY IS SET AND ITS DATA

```
<ics:TargetobjectpolicySet>
 <ics:Targetobjectpolicy>
  <ics:Comment>
   2009/1/1 LECTURE MEETING  CONTACT DOCUMENT OF LECTURER
  </ics:Comment>
  <ics:ObjectService type="DATA SETTING" name="ADDRESS BOOK">
   <ics:ObjectServiceData id="1" name="NAME" value="d…" />
   <ics:ObjectServiceData id="1" name="PHONETIC TRANSCRIPTION" value="D…" />
   <ics:ObjectServiceData id="1" name="MAIL ADDRESS"
    value="D….@jp.aaa.com" />
  </ics:ObjectService>
 </ics:Targetobjectpolicy>
 <ics:Targetobjectpolicy>
  <ics:Comment>
   2009/1/1 LECTURE MEETING  LECTURE INFORMATION
  </ics:Comment>
  <ics:ObjectService type="FILE MANAGEMENT" name="FILE SHARE" >
   <ics:ObjectServiceParameterSet>
    <ics:ObjectServiceParameter dir="in" type="url" name="sfile"
     value="http://sd.rd.aaa.co.jp/20090101/DOCUMENT-d….pdf" />
    <ics:ObjectServiceParameter dir="out" type="oid" name="fid" />
   </ics:ObjectServiceParameterSet>
  </ics:ObjectService>
 </ics:Targetobjectpolicy>
 ..
</ics:TargetobjectpolicySet>
```

SPECIFY OBJECT TO WHICH POLICY SETTING IS APPLIED

```
<ics:TargetobjectSet>
 <ics:Targetobject id="" name="dev-PC">
  <ics:Targetperiod>
   <ics:Targetperiodstart>
    <ics:date>2009-01-01</ics:date>
    <ics:time>07:00:00+09:00</ics:time>
   </ics:Targetperiodstart>
   <ics:Targetperiodend>
    <ics:date>2009-01-01</ics:date>
    <ics:time>18:00:00+09:00</ics:time>
   </ics:Targetperiodend>
  </ics:Targetperiod>
  <ics:Targetplace>
   <pi codeSpace="ics_bld.pi.b.aaa.co.jp">
    b LABORATORY.1F.c HALL
   </pi>
  </ics:Targetplace>
  <ics:TargetObjectService type="FILE MANAGEMENT" name="FILE SHARE" />
  <ics:RelatedObject relation="near" maxnumber="2">
   <ics:RelatedObjectService type="DATA SETTING" name="DATE BOOK" />
    <ics:RelatedObjectServiceData name="TITLE" value="LECTURE MEETING" />
    <ics:RelatedObjectServiceData name="DATE" value="2009-01-01" >
   </ics:RelatedObjectService>
  </ics:RelatedObject>
 </ics:Targetobject>
 ..
</ics:TargetobjectSet>
```

INFORMATION MANAGEMENT APPARATUS, INFORMATION MANAGEMENT METHOD, AND INFORMATION MANAGEMENT PROGRAM

CROSS-REFERENCE TO RELATED APPLICATION

This application is a continuation of International Application No. PCT/JP2009/064465, filed on Aug. 18, 2009, the entire contents of which are incorporated herein by reference.

FIELD

The present invention relates to an information management apparatus, an information management method, and an information management program.

BACKGROUND

Conventionally, setting information and internally held information of a device are no more than initial values or information set by a user. Even when an environment or a situation is changed, it is not possible to change the settings in response to the change. Therefore, the user carries out setting changes, or addition or deletion of information corresponding to the environment or the situation as necessary.

Accordingly, a configuration of an electronic device has been conceived that acquires information from outside and changes setting items as appropriate. More specifically, there is an electronic device known to carry out operations based on external information by acquiring the external information and by automatically changing the setting information of the electronic device in accordance with a flow programmed in advance without an operation of the user.

Patent Document 1: Japanese Laid-open Patent Publication No. 2003-004879

However, with conventional technologies, it is not possible to set a device in a desirable device state in response to the situations of surrounding devices. More specifically, it is not possible to entrust a system to determine what the situation is based on information of a plurality of surrounding devices, and what to do in particular situations. Therefore, the data and services of the device may be separated from the surrounding devices, the situation, or the environment.

The separation from surrounding devices is exemplified. When extension numbers of all associated departments are registered as initial data on a house phone used in an office, a registering operation occurs each time a new phone is purchased. At present, even though a house phone in one department has virtually the same initial data registered, it is not possible to perform an operation to set exactly the same initial data in the newly purchased phone. In this example, the information held in the device is separated from the surrounding devices. In another example, even when all other cellular phones present in a meeting room are set in silent mode, the setting of your own cellular phone is not affected at all and your cellular phone only may ring during a meeting. In this example, the setting information of the device is separated from the surrounding devices.

The separation from the surrounding situation or environment is exemplified. In a room for a meeting, even when there are some document files and such used for the meeting, it is difficult to obtain the file data upon entering the meeting room as a trigger or to delete unnecessary files upon leaving the meeting room. In this example, the information held in the device is separated from the environment. In another example, in a lecture hall, even when there is a rule that cellular phones must be set in silent mode, it is not possible to enforce the rule on cellular phones. In this example, the setting information of the device is separated from the environment.

These examples can be an issue even for home electric appliances or server machines. However, particularly with mobile terminals such as cellular phones, PDAs, and notebook PCs, as their locations of use and surrounding environments often change, in terms of being troublesome to change the settings each time they change, there are many occasions where the application of the technologies disclosed herein is expected.

SUMMARY

According to an aspect of an embodiment of the invention, an information management apparatus includes: an object management unit that manages at least information concerning the own apparatus and a function of the own apparatus as an object disclosable to another apparatus; a communication unit that receives from the other apparatus at least any of an object that the other apparatus manages, data that complies with the object of the own apparatus, and a policy that defines an operating action and an operating condition of the object managed by the other apparatus; and a controller that controls operations of the own apparatus using at least any of the object that the object management unit manages and the policy.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 14 is a diagram for explaining data for information management described in XML;

FIG. 15 is a diagram for explaining an object definition described in XML;

FIG. 16 is a diagram for explaining a first example of a device policy described in XML; and FIG. 17 is a diagram for explaining a second example of a device policy described in XML.

DESCRIPTION OF EMBODIMENT

An embodiment of an information management apparatus, an information management method, and an information management program according to the invention will be described in detail hereinafter with reference to the accompanying drawings. However, the embodiment is not intended to restrict the disclosed technology.

Figure 1:
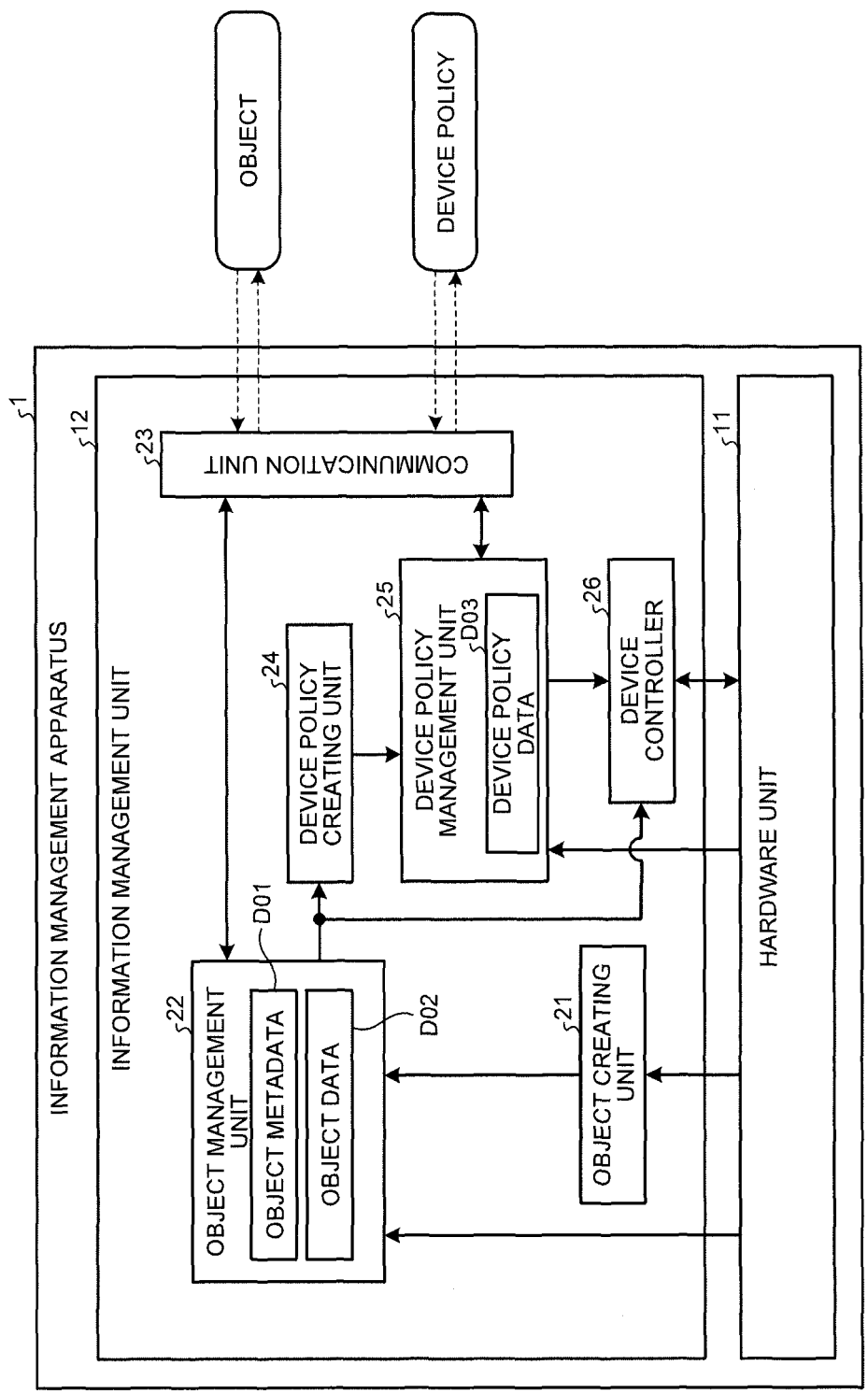
FIG. 1 is a block diagram schematically illustrating a configuration of an information management apparatus according to an embodiment.

FIG. 1 is a block diagram schematically illustrating a configuration of an information management apparatus according to the embodiment. As illustrated in FIG. 1, an information management apparatus 1 includes a hardware unit 11 and an information management unit 12. The hardware unit 11 includes physical components such as an I/O interface and a communication unit. Various functions that the information management apparatus 1 provides are realized by the hardware unit 11.

The information management unit 12 manages information concerning the information management apparatus 1 and functions of the information management apparatus 1 as objects disclosable to other apparatuses. The information management unit 12 further communicates with external apparatuses to send and receive objects, data that comply with objects of the own apparatus, policies that define operating actions and operating conditions of objects, and such. The information management unit 12 then uses the objects, the policies, and such to control operations of the hardware unit 11.

In other words, the information management unit 12 enables respective functions of the own apparatus to be handled as abstraction objects. The information management unit 12 further recognizes similarly other abstraction apparatuses as objects, and enables the other apparatuses to be linked without being affected by the difference in hardware.

More specifically, the information management unit 12 includes an object creating unit 21, an object management unit 22, a communication unit 23, a device policy creating unit 24, a device policy management unit 25, and a device controller 26.

The object creating unit 21 acquires information from the hardware unit 11 to create objects of the own apparatus, and outputs the objects to the object management unit 22. The object management unit 22 carries out the management of objects. The objects managed by the object management unit 22 include objects created by the object creating unit 21, objects received from the outside by the communication unit 23, and objects directly input via the hardware unit 11.

The object management unit 22 manages objects with object metadata D01 and object data D02. The object data D02 is an object itself, and the object metadata D01 is management data to manage an object.

Figure 2:
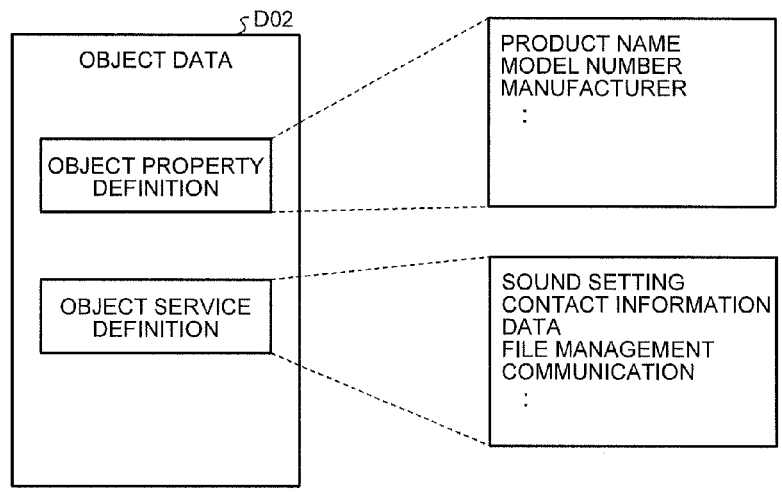
FIG. 2 is a diagram for explaining a specific example of object data D02.

FIG. 2 is a diagram for explaining a specific example of object data D02. The object data D02 includes an object property definition and an object service definition. The object property definition is the information concerning the information management apparatus 1 such as a product name, a model number, and a manufacturer of the information management apparatus 1. The object service definition is the information concerning the functions of the information management apparatus 1 such as a sound volume setting, contact information data, file management, and communication.

The explanation is continued referring back to FIG. 1. The communication unit 23 carries out sending and receiving of objects, device policies, data, and such. The communication by the communication unit 23 is realized inside the hardware unit 11 in fact. As for a specific method of communication, any method such as infrared communication, Bluetooth (registered trademark), wireless local area network (LAN), and wired LAN can be used. In the communication unit 23, it is not necessary to distinguish the communication method.

The object management unit 22 can detect the presence of an external object and receive the external object using the communication unit 23. The object management unit 22 can further send an object of the own apparatus that it manages and any other data via the communication unit 23.

The device policy creating unit 24 creates a device policy that defines an operating action and an operating condition of an object based on the object managed by the object management unit 22, and outputs the device policy to the device policy management unit 25.

The device policy management unit 25 carries out the management of device policies. The device policies that the device policy management unit 25 manages include device policies created by the device policy creating unit 24, device policies received from the outside by the communication unit 23, and device policies directly input via the hardware unit 11.

Figure 3:
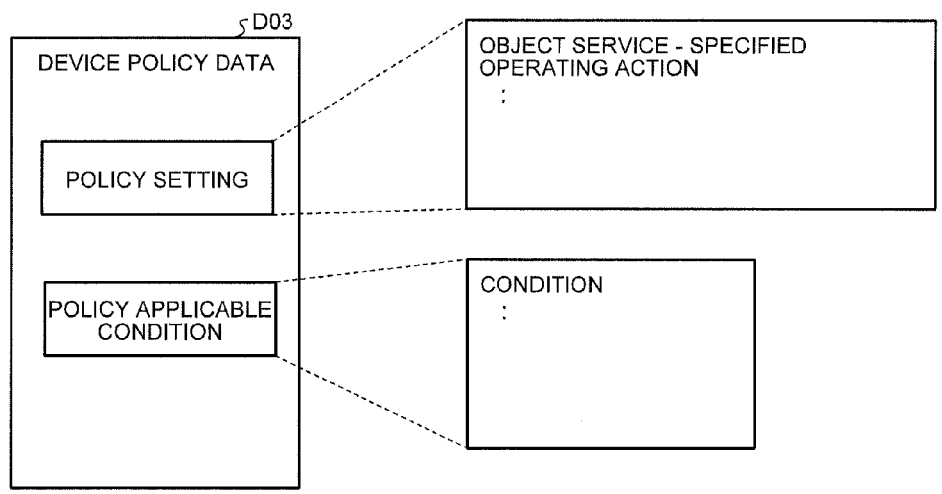
FIG. 3 is a diagram for explaining a specific example of device policy data D03.

The device policy management unit 25 manages device policies as device policy data D03. FIG. 3 is a diagram for explaining a specific example of device policy data D03. The device policy data D03 includes a policy setting and a policy applicable condition. The policy setting defines an operating action of an object. More specifically, the policy setting associates information specifying an object service with information specifying an action of the service. The policy applicable condition defines a condition in which an operating action defined by a policy setting is executed. For the condition, the states of surrounding objects, the number of surrounding objects, time, location, and such can be used.

The explanation is continued referring back to FIG. 1. The device controller 26 controls the hardware unit 11 based on the objects and the device policies managed by the object management unit 22 and the device policy management unit 25, respectively, to reflect changes in states of objects to a physical state of the information management apparatus 1.

More specifically, when the object management unit 22 changes a state of the own object, the device controller 26 makes the hardware unit 11 reflect the changed content. The device controller 26 further monitors a condition indicated in a device policy, and when the condition is satisfied, it makes the hardware unit 11 reflect an operating action defined.

Figure 4:
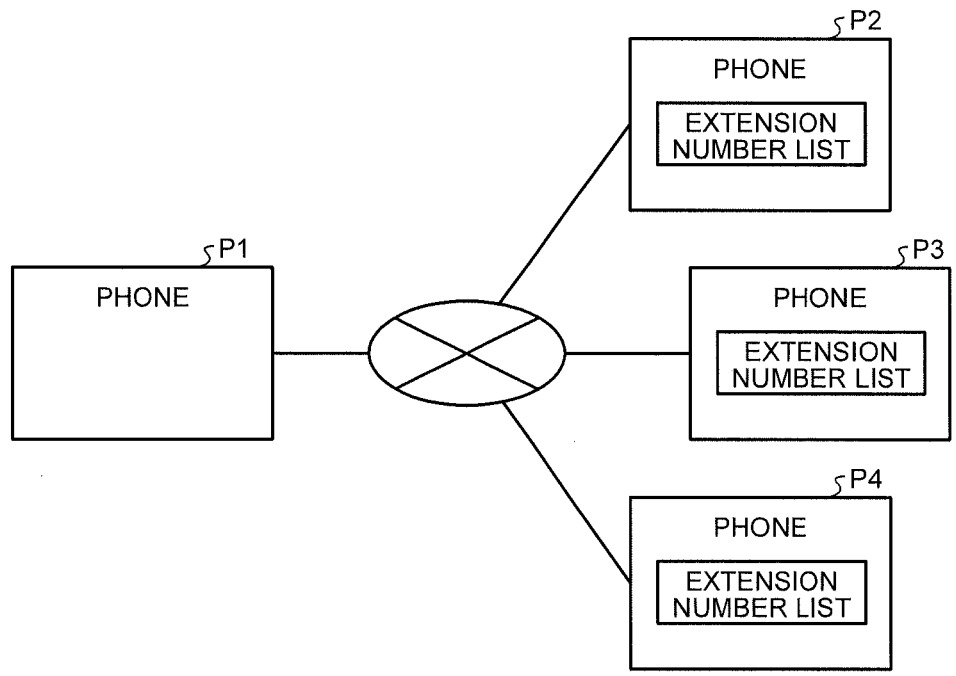
FIG. 4 is a diagram for explaining an automated registering operation of an extension number list on a phone.

With reference to FIGS. 4 to 7, operation examples of the information management apparatus will be explained. Phones P1 to P4 illustrated in FIG. 4 are each an information management apparatus, and recognize one another as objects. The phones P1 to P4 are connected to a network, and the phones P2 to P4 store therein respective extension number lists of the same content.

The phones P1 to P4 transmit their own states as an object to one another. The phone P1 recognizes that the phones P2 to P4 store therein the extension number lists that the phone P1 itself does not have, and acquires the extension number list from any of the phones P2 to P4 as must-have data of the own object. For example, when the extension number list (device policy) is not present inside the phone P1, the phone P1 either receives the extension number list (device policy) from any of the phones P2, P3, and P4, or automatically generates a device policy common to the phones P2 to P4 inside the phone P1 based on the device policies received from the phones P2 to P4 and registers the device policy. Consequently, the operation to register the extension number list to the phone P1 can be automated.

Figure 5:
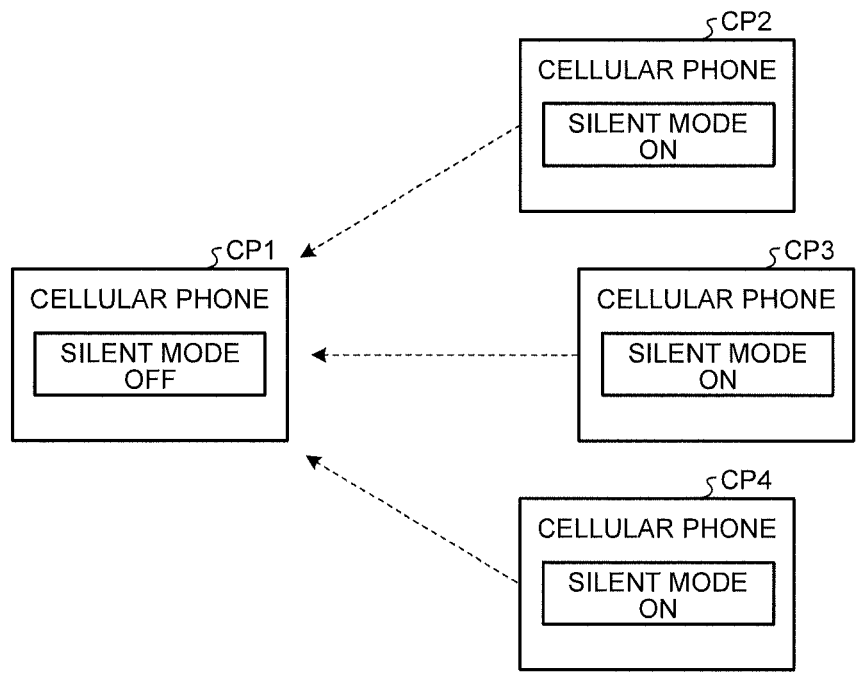
FIG. 5 is a diagram for explaining an example of setting a silent mode corresponding to surrounding cellular phones.

Cellular phones CP1 to CP4 illustrated in FIG. 5 are each an information management apparatus, and recognize one another as objects. The cellular phone CP1 recognizes the presence of the cellular phones CP2 to CP4 in vicinity by a near field communication method using infrared and such, and exchanges object data with the cellular phones CP2 to CP4.

As for the object data, as various settings of a cellular phone, the on/off setting of silent mode, the on/off setting of auto-answer mode, the call blocking setting, and other settings are exchanged.

As a result, the cellular phone CP1 recognizes that the cellular phones CP2 to CP4 are all set to silent mode on, i.e., a state in which no sound is emitted when receiving a call and such. While the cellular phone CP1 is set to silent mode off, because the surrounding cellular phones are set to silent mode on, the cellular phone CP1 changes the state of silent mode setting service of the own object from on to off. While the silent mode is exemplified here, the cellular phone CP1 recognizes the settings common to the cellular phones CP2 to CP4 and sets them to itself.

The change in the state of the own object is reflected in the actual setting of the cellular phone CP1. When the own object is changed, the cellular phone CP1 further sends the updated data of the own object to the cellular phones CP2 to CP4.

Figure 6:
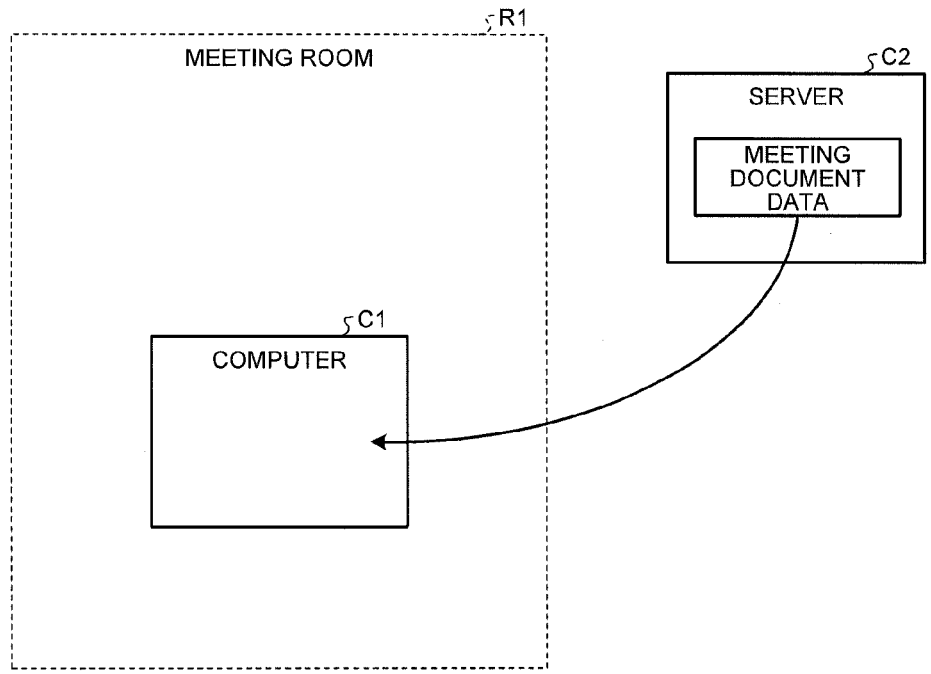
FIG. 6 is a diagram for explaining an example of distributing documents to a computer in a meeting room.

A notebook computer C1 illustrated in FIG. 6 receives meeting document data from a server C2 when entering a meeting room R1. The computer C1 and the server C2 here are connected by a wired LAN and such, and recognize each other as an object. For the detection of the computer C1 entering the meeting room R1, for example, when routers installed in rooms are managed corresponding to the respective rooms, it can be realized by identifying the router and such in a network to which the computer C1 is connected.

Delivering data based on the information of location in this manner enables the automatic distribution of the data used in a meeting room. Furthermore, the security for the data can be enhanced by such as deleting the data when leaving the meeting room, and restricting an access for the data by a time frame or the time.

Figure 7:
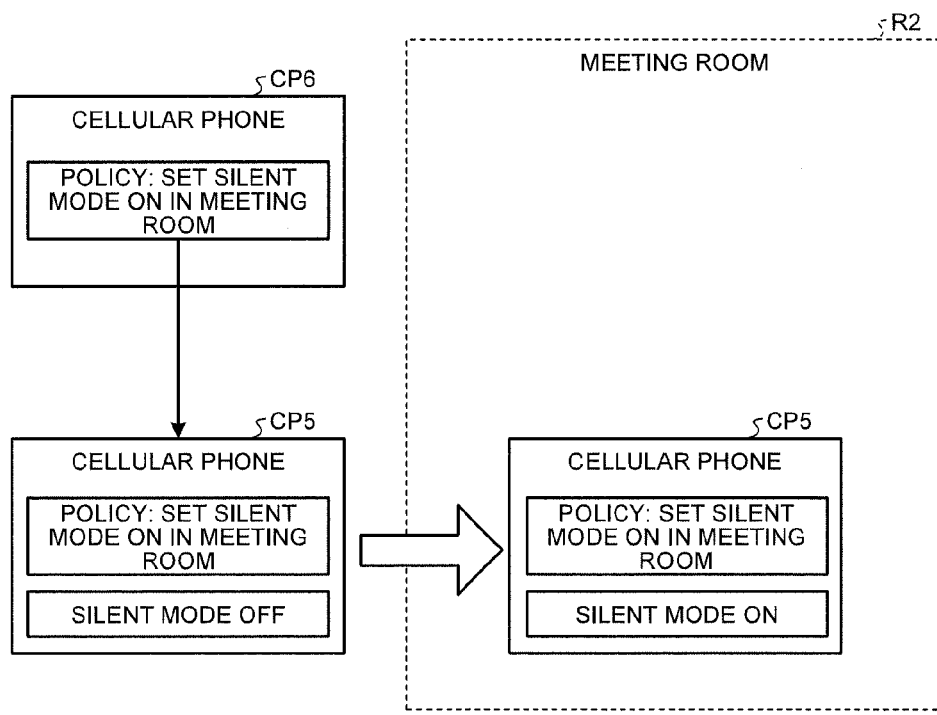
FIG. 7 is a diagram for explaining an example of receiving a device policy from outside.

A cellular phone CP5 illustrated in FIG. 7 receives a device policy from a cellular phone CP6. The device policy received defines that the cellular phone is set in silent mode in a meeting room. Accordingly, when the cellular phone CP5 is brought into a meeting room R2, the condition of the policy is satisfied and the silent mode is set to on. The owner of the device does not create a device policy but receives a device policy belonging to other objects, as referred to in this example, and thus rules to be shared become applicable automatically.

Figure 8:
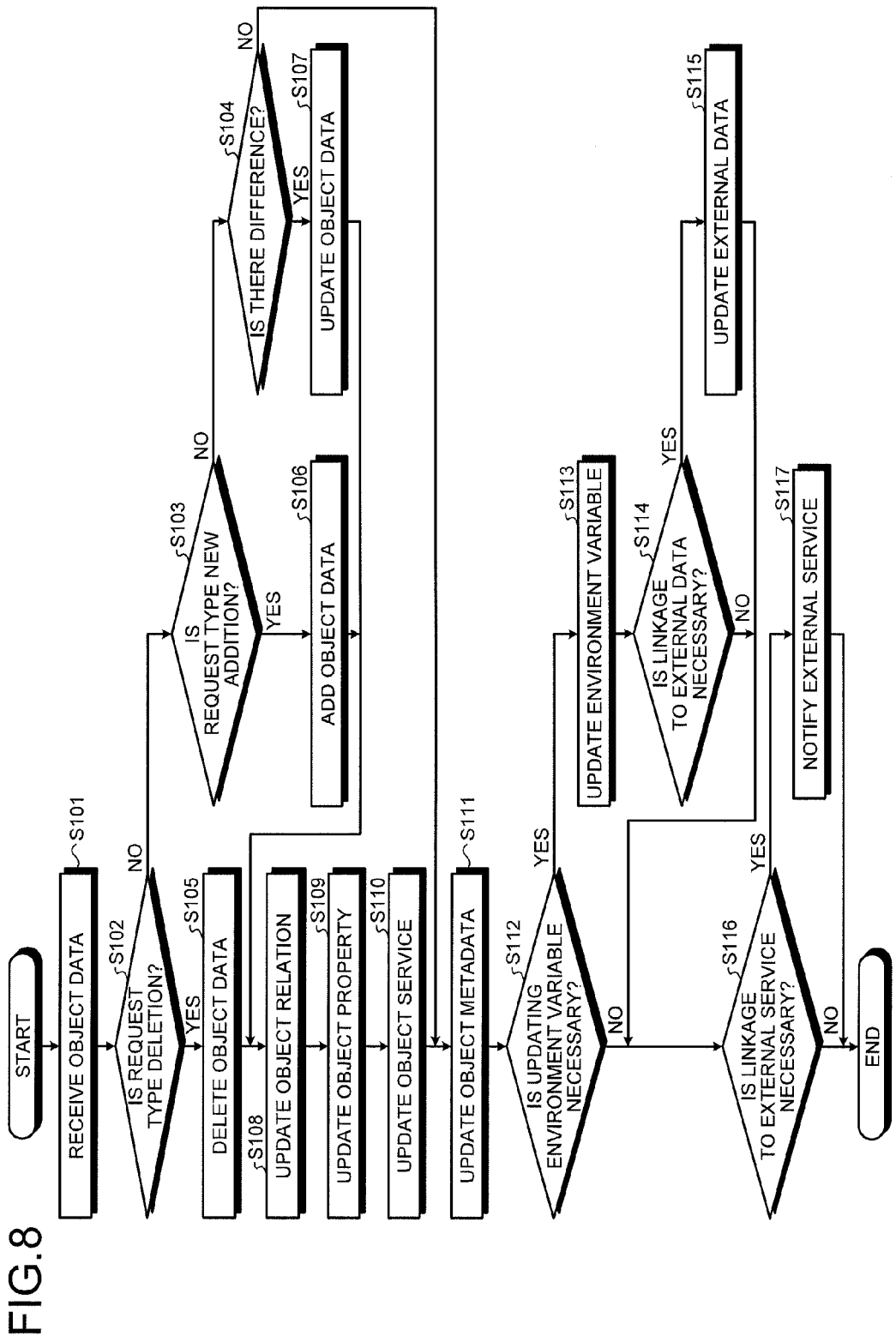
FIG. 8 is a flowchart for explaining a processing operation of updating object data.

The processing operation of the object management unit 22 will be described next. FIG. 8 is a flowchart for explaining a processing operation of updating object data by the object management unit 22. The object management unit 22 first receives object data via a communication channel established in advance (S101).

The object management unit 22 then determines a request type of the object data received. When the request type is a request for deletion (Yes at S102), the object management unit 22 deletes the object data (S105). When it is not a request for deletion (No at S102), the request is a request for addition.

When the request is for addition but the own apparatus does not have the object data, i.e., the request is for new addition (Yes at S103), the object management unit 22 adds the object data (S106). When it is not for new addition (No at S103) but is for addition with some difference to the object data that the own apparatus already has (Yes at S104), the object management unit 22 updates the object data (S107). In other cases, the object management unit 22 leaves only a history of the request received as object metadata.

After the object is added, changed, or deleted, the object management unit 22 updates object relations representing relationships among objects (S108), updates an object property (S109), and updates an object service (S110). After the stored information of the object (service, data, and such) is updated, the object management unit 22 sends out a request to notify other apparatuses of the update of the object.

Furthermore, the object management unit 22 updates metadata associated with the object, i.e., the update history of the object (S111). The object information updated may be linked not only to the information management unit 12 but also to external data and external services. For example, in a cellular phone, a device unique number and a manufacturer name of the cellular phone that are managed by basic software may be linked as the data to which the information management unit 12 refers. Similarly, in a cellular phone, a date book service that is managed by the basic software may be referred to and the data in the date book service may be linked.

For these operations, access permission is set by a user. Setting access permission to data or service when describing an object representation makes it possible to operate such an object only with the permission to read, write, or execute.

In the processing operation illustrated in FIG. 8, after the update of the object metadata (S111), the object management unit 22 determines whether the update of environment variables is necessary (S112). When the update of environment variables is necessary (Yes at S112), the object management unit 22 carries out the update of environment variables (S113). After the update of environment variables (S113), the object management unit 22 determines whether the linkage to external data is necessary (S114). When the linkage to external data is necessary (Yes at S114), the object management unit 22 updates the external data (S115).

When the update of environment variables is not necessary (No at S112), when the linkage to external data is not necessary (No at S114), or when the update of the external data is carried out (S115), the object management unit 22 determines whether the linkage to an external service is necessary (S116).

When the linkage to an external service is necessary (Yes at S116), the object management unit 22 notifies the external service of the change in the object (S117), and finishes the process. When the linkage to an external service is not necessary (No at S116), the object management unit 22 finishes the process as it is.

Figure 9:
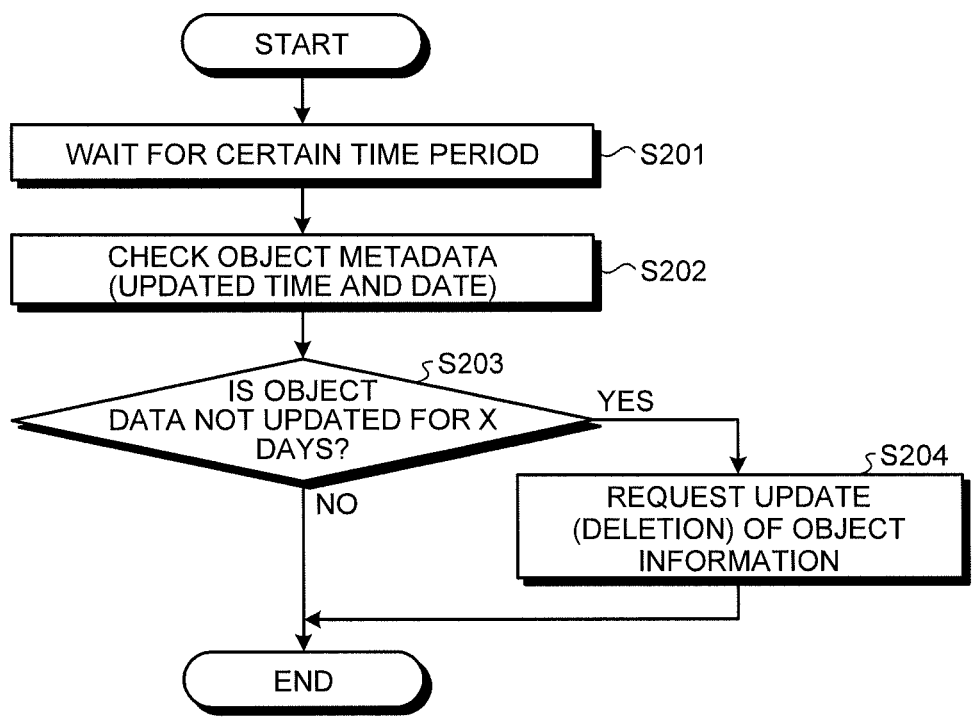
FIG. 9 is a flowchart for explaining deletion of object data based on time course.

FIG. 9 is a flowchart for explaining deletion of object data based on the time course. Because information of objects is collected from surrounding terminals, the amount of information becomes enormous. In a device of a limited storage area such as a cellular phone, it is preferable to delete the information of objects after a given period of time. Because the update history of an object is managed in object metadata, the object management unit 22 deletes objects, which are not updated for a given period of time or longer, by creating a request to delete such objects.

More specifically, with an interval of a certain period of time (S201), the object management unit 22 periodically checks updated time and date of the object metadata D01

(S202). When there is object data present that is not updated for a given period of time, for example, more than X days (Yes at S203), the object management unit 22 issues a request to delete the object (S204) and finishes the process. Meanwhile, when the time elapsed from the updated time and date of object data is shorter than the given period of time (No at S203), the object management unit 22 finishes the process as it is.

Figure 10:
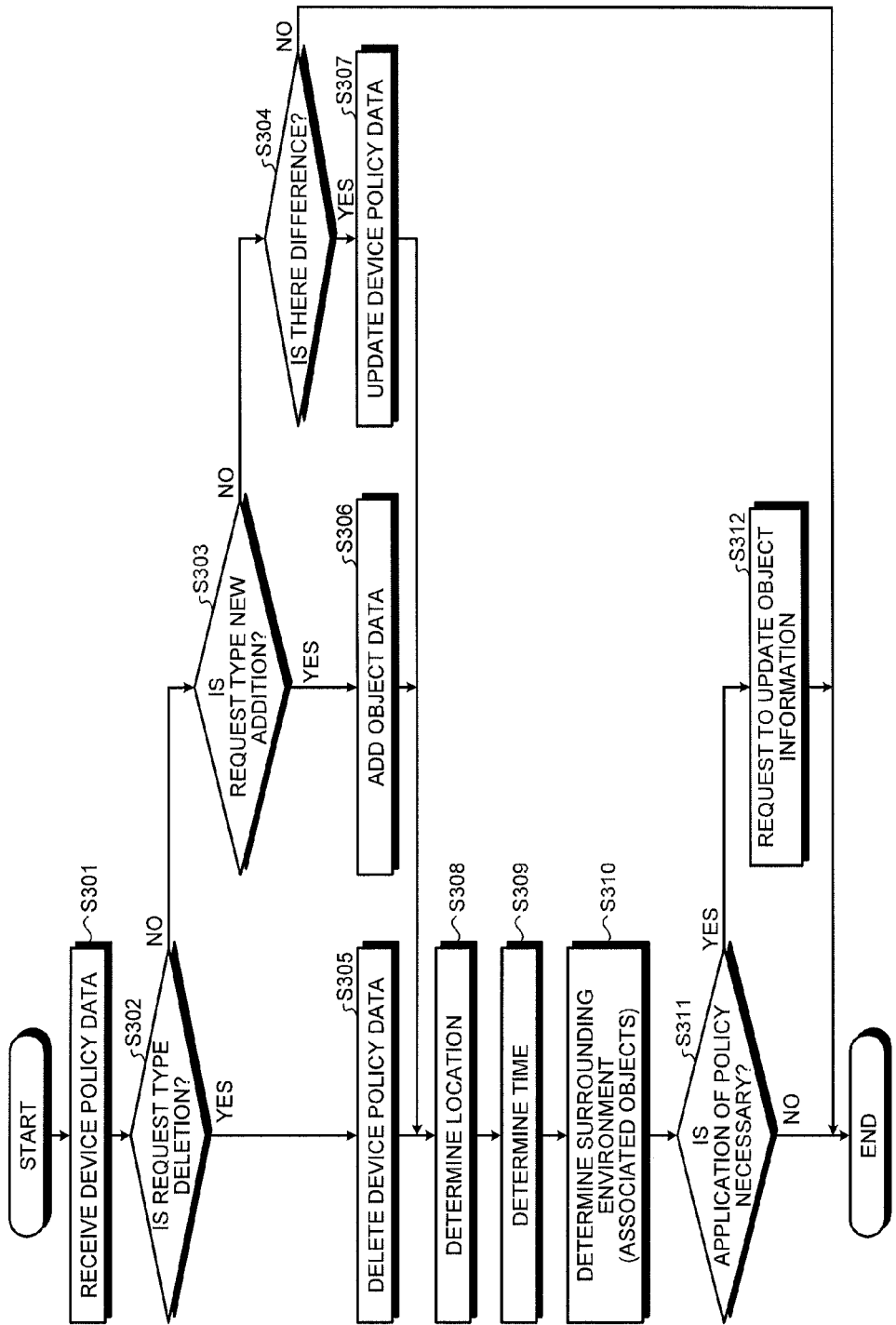
FIG. 10 is a flowchart for explaining a processing operation of updating a device policy.

The processing operation of the device policy management unit 25 will be described next. FIG. 10 is a flowchart for explaining a processing operation of updating a device policy by the device policy management unit 25. The device policy management unit 25 receives a device policy (S301). The device policy may be a policy received from outside via a communication channel established in advance, a policy created by the device policy creating unit 24, or a policy directly input from the hardware unit 11.

The device policy management unit 25 determines a request type of the device policy received. When the request type is a request for deletion (Yes at S302), the device policy management unit 25 deletes the device policy (S305). When it is not a request for deletion (No at S302), the request is a request for addition.

When the request is for addition but the own apparatus does not have the policy data, i.e., the request is for new addition (Yes at S303), the device policy management unit 25 adds the policy data (S306). When it is not for new addition (No at S303) but is for addition with some difference to the device policy that the own apparatus already has (Yes at S304), the device policy management unit 25 updates the device policy (S307). In other cases (No at S304), the device policy management unit 25 finishes the process as it is.

After the device policy is added, changed, or deleted, the device policy management unit 25 moves into a device policy application phase. To apply the device policy, the device policy management unit 25 first determines the location and the time of the own apparatus (S308, S309). The device policy management unit 25 then determines whether it is necessary to apply the updated device policy to an object group managed in the own apparatus (S310).

When determining the necessity of application, a relation between objects may be determined. Examples of the relation include closeness, an inclusion relation, and the presence of contact of the objects. For example, to describe an applicable condition using the closeness of objects, an applicable condition to be used is the one that uses a relation of an object with surrounding objects, such as, in the surrounding of a cellular phone, when there exist three or more objects that correspond to cellular phones with their states of silent mode being set to on. This becomes a condition to apply a device policy. When the application of the device policy is necessary (Yes at S311), the device policy management unit 25 updates the object information in the own apparatus, sends out a request to notify other apparatuses of the update of the object (S312), and then finishes the process.

Figure 11:
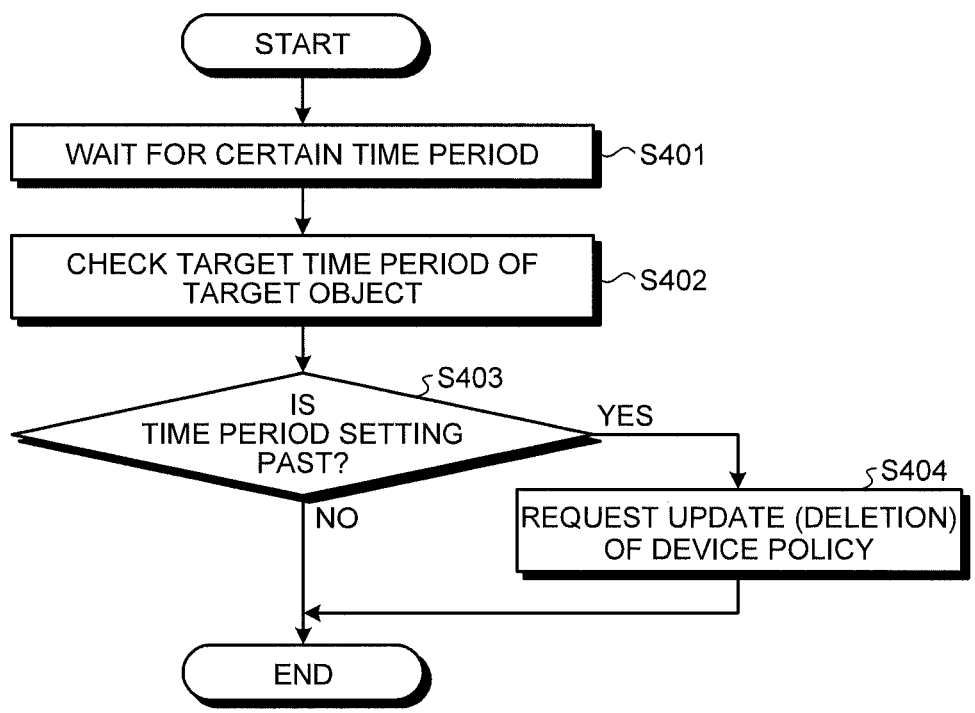
FIG. 11 is a flowchart for explaining deletion of a device policy based on time course.

FIG. 11 is a flowchart for explaining deletion of a device policy based on the time course. Some device policies are set a time for. After a certain period of time, device policies are checked periodically, and a policy of an old time period setting may be deleted.

More specifically, with an interval of a certain time period (S401), the device policy management unit 25 periodically checks a target time period of a target object of a device policy (S402). As a result, when the target time period is past (Yes at S403), the device policy management unit 25 issues a request to delete the device policy (S404) and finishes the process.

Meanwhile, when the target time period is not past (No at S403), the device policy management unit 25 finishes the process as it is.

The creation of a device policy by the device policy creating unit 24 will be described next. The device policy creating unit 24 automatically generates a device policy based on a service of a current object.

For example, considered will be a situation where a server that manages schedule information of employees and a cellular phone establish a communication channel and recognize each other as an object. The server delivers schedule data to the cellular phone, and the cellular phone stores therein the schedule data.

At that time, in the cellular phone, with the update of object data as a trigger, automatic generation of a device policy is carried out. The object services managed in the cellular phone are tallied, and the data in the date book service is also searched with regard to whether a certain number or more of all the objects are of the same data. When there are a certain number of pieces of such data present, the data for the date book service is converted into a form of device policy.

Figure 12:
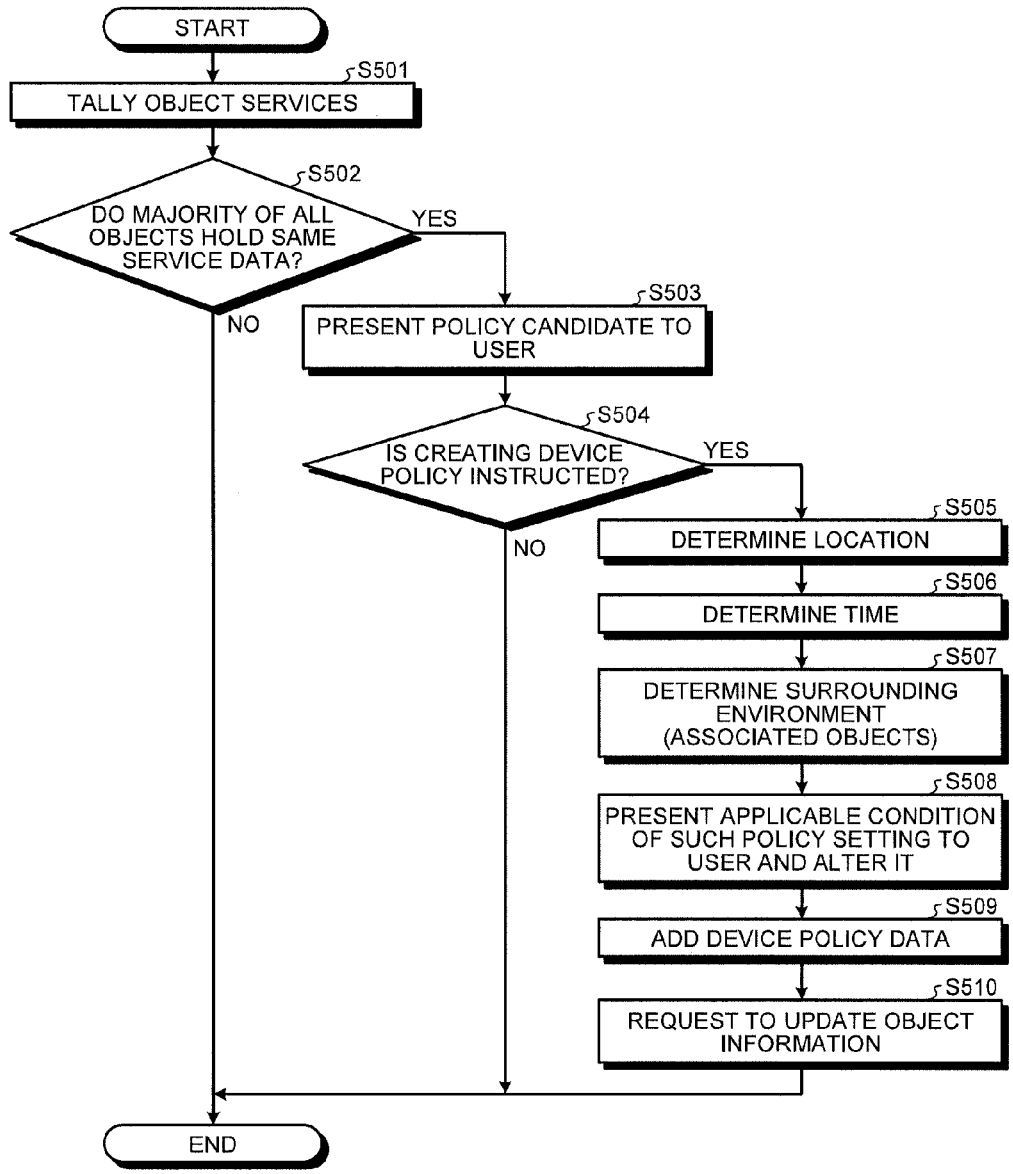
FIG. 12 is a flowchart for creating a device policy based on object services.

FIG. 12 is a flowchart for creating a device policy based on object services. The device policy creating unit 24 first tallies object services in the information management apparatus 1 (S501). As a result of tallying, a candidate of device policy is created based on a service that accounts for a certain number of all the objects. For example, it includes a situation in which the tallying operation is carried out in the cellular phone while the user is working in an office of a company, and the following day's schedules are matched among a majority of surrounding objects.

When there is service data that accounts for a certain number of all the objects (Yes at S502), the device policy creating unit 24 prepares as a policy candidate, based on the service data, a policy that sets the same setting as the service data, and presents the policy candidate to the user (S503). For example, in the above-described example, the cellular phone converts the application of data of the following day's schedule applied to a majority of the objects into a form of device policy, and then asks the user whether the application of the device policy is necessary.

When the candidate of device policy presented is accepted by the user, and creation of the device policy is instructed (Yes at S504), the device policy creating unit 24 determines a location, time, and the surrounding environment to which the device policy is applicable as the information necessary when applying the device policy (S505 to S507).

After the determination, the device policy creating unit 24 confirms with the user and asks for alteration as necessary (S508). The device policy creating unit 24 adds the completed device policy (S509), updates object information in the own apparatus, sends out a request to notify the other apparatuses of the update of the object (S510), and then finishes the process.

The creation of a device policy based on object histories will be described next. As an example, illustrated is a situation in which a cellular phone is brought into a lecture hall, a request for addition of an object to surrounding devices is carried out, and silent mode setting data from other objects is received. In the cellular phone, with the update of object data as a trigger, automatic generation of a device policy is carried out. The cellular phone tallies object properties and object services that it manages, and searches with regard to whether a similar surrounding environment is present in the past surrounding environments in which the object data are stored.

For example, the cellular phone searches histories of silent mode setting data stored in the past and carries out a tallying operation on surrounding environments at those times, and then checks on similarity of environments with regard to whether there are common parts between the surrounding environments in the past histories and the current surrounding environments. At that time, the similarity may be determined not with an exact match but with a loose match.

It is assumed that, based on the search in the past data of silent mode setting data stored, the common part between the surrounding environments in the histories and the current surrounding environments is that four or more objects that are set in silent mode are present nearby. In this case, the cellular phone changes the similar environment into a form of applicable condition of a device policy, and creates a candidate of device policy by which the silent mode is set to on when the applicable condition is satisfied. Then, it presents the candidate to the user to ask whether the application of the device policy is necessary.

Figure 13:
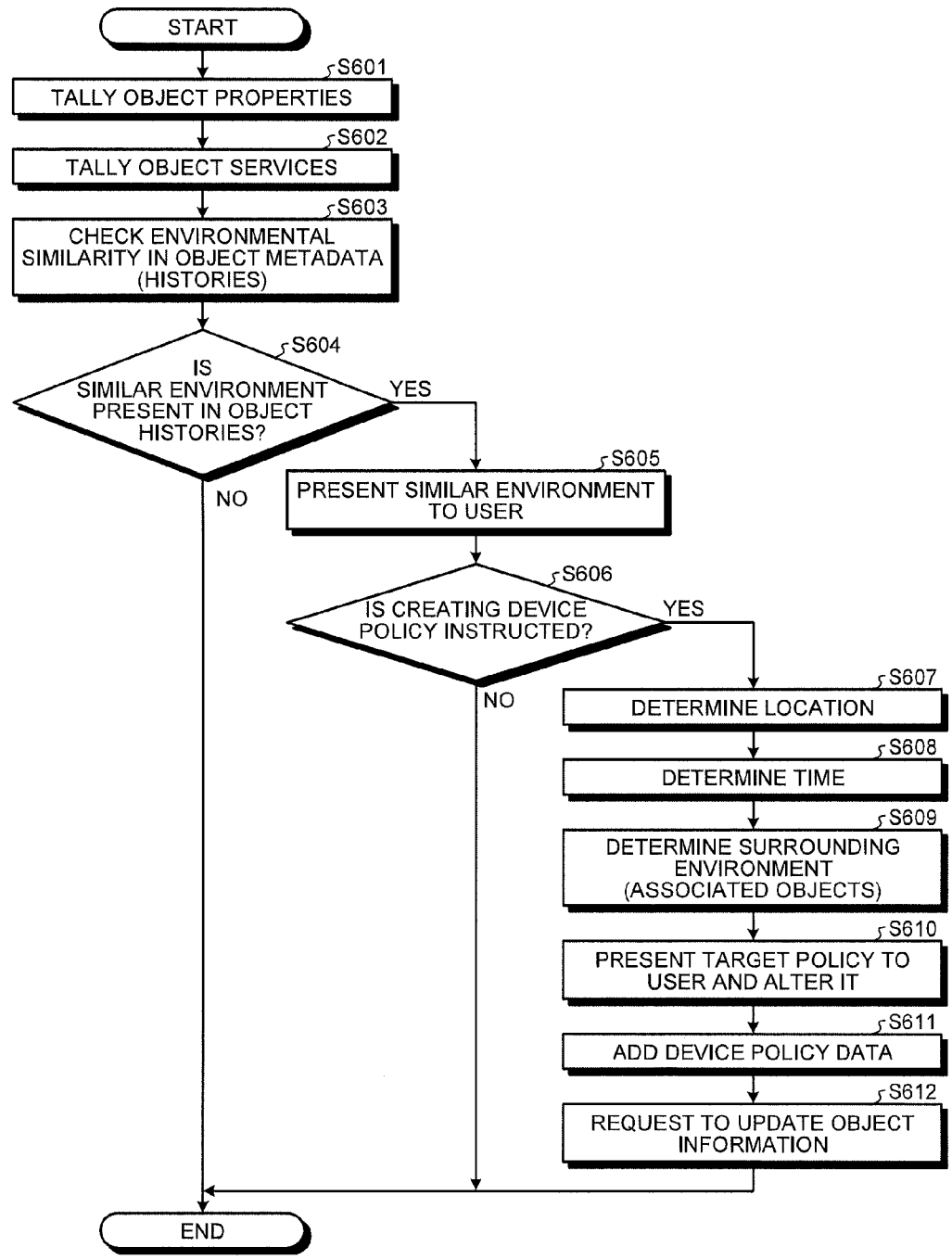
FIG. 13 is a flowchart for creating a device policy based on object histories.

FIG. 13 is a flowchart for creating a device policy based on object histories. The device policy creating unit 24 first tallies object properties and object services in the information management apparatus 1 (S601, S602). The device policy creating unit 24 checks on a similarity of environment between the tallying result and the update histories of objects that are represented by object metadata (S603).

When there is a similar environment present in the object histories (Yes at S604), the device policy creating unit 24 presents the similar environment to the user (S605).

When the candidate of policy presented is accepted by the user and creation of the device policy is instructed (Yes at S606), the device policy creating unit 24 determines a location, time, and the surrounding environment to which the device policy is applicable as the information necessary when applying the device policy (S607 to S609).

After the determination, the device policy creating unit 24 confirms with the user and asks for alteration as necessary (S610). The device policy creating unit 24 adds the completed device policy (S611), updates object information in the own apparatus, sends out a request to notify the other apparatuses of the update of the object (S612), and then finishes the process.

Representation examples of various types of information described in extensible markup language (XML) by the information management unit 12 will be described next. In the example illustrated in FIG. 14, the data for information management are described with ICS tags.

Data D10 illustrated in FIG. 14 defines an object with ics:ObjectdataSet tags, and defines a device policy setting, i.e., content of the policy for an applicable object, with ics:PolicySet tags. Defining the description content of ics:ObjectdataSet tags as data D11 and the description content of ics:PolicySet tags as data D12, specific examples will be given.

FIG. 15 is a specific example of data D11. As illustrated in FIG. 15, the data D11 is described using ics:Comment tags, ics:ObjectPropertySet tags, ics:ObjectServiceSet tags, and such. The ics:Comment tag is for describing comments. The ics:ObjectPropertySet tag represents a definition of object property. The ics:ObjectServiceSet tag represents a definition of object service.

In the example illustrated in FIG. 15, as the definition of property, it is described that the product name is cellular phone, the model number is F-01A, the manufacturer is aaa company, and an object group is ICS-aaa.

Furthermore, in the definition of service, represented are respective values of the current settings and respective values of permission controls with respect to a service to detect surrounding objects, a service to set sound, a service to set address book data, a service to share files, and a service to perform infrared communication. The permission control is represented by the value of permit. Each of three digits of permit corresponds to the own apparatus, other apparatuses in the same group, and apparatuses outside the group, respectively, and each digit takes a value of 0 to 7. The value of each digit is of a decimal number converted from a 3-bit binary number in which each of the bits represents whether to read or not, to write or not, and to execute or not, respectively.

FIG. 16 is a specific example of data D12. As illustrated in FIG. 16, the data D12 is described using ics:TargetobjectpolicySet tags, isc:TargetobjectSet tags, and such. The ics:TargetobjectpolicySet tag specifies an object service for which the policy is set and its data. In the example illustrated in FIG. 15, the ics:TargetobjectpolicySet tag specifies to set a value of OFF for the sound setting service.

The ics:TargetobjectSet tag represents an execution condition of the policy by specifying an object to which the policy setting is applied. In the example illustrated in FIG. 16, it specifies that the condition of location is c hall on the first floor in b laboratory, and as a condition of surrounding objects, there exist three or more objects taking a value of OFF for their sound settings.

FIG. 17 is another specific example of data D12. In the example illustrated in FIG. 17, the ics:TargetobjectpolicySet tag specifies the name and its phonetic transcriptions of a lecturer of a lecture meeting, and to register his/her e-mail address in the address book and share lecture documents of the lecture meeting.

Furthermore, in the example illustrated in FIG. 17, the ics:TargetobjectSet tag specifies that a condition of time is from 7:00 to 18:00 on Jan. 1, 2009; a condition of place is c hall on the first floor in b laboratory, and as a condition of surrounding objects, there exist two or more objects registered with the schedule of the lecture meeting.

As described in the foregoing, the information management apparatus 1 according to the present embodiment represents devices based on provided services and stored data in the apparatus, manages surrounding apparatuses by such a model, and defines a device policy of what kind of device state is desirable when the surrounding environment is constituted by a plurality of devices in particular states.

Accordingly, a device information setting adapted to states of surrounding devices and an environment becomes possible. In other words, not like a conventional technology that updates the settings of device information when certain external data is received, by describing how to set the state of the device when a plurality of surrounding devices are in particular states, operations and information settings are carried out in accordance with the surrounding devices. Consequently, an information management system in which the setting information and services of the device are controllable in response to states of surrounding devices can be provided.

The present embodiment has been exemplified on the assumption of a single information management system that is structured on a single apparatus for a single user, more specifically, structured with a single information management unit. However, the disclosed technology is not restricted as such, and a plurality of users may be assigned on a single information management system or there may be an information management system to which any user is not assigned. Furthermore, a plurality of information management systems may be structured on a single apparatus. Moreover, the functions of a single information management system may be distributed to a plurality of apparatuses, such as a case that a part of functions like the detection of other objects is treated by other apparatuses, or that a part of data is separately held on other apparatuses, and the like.

Furthermore, the information management unit 12 illustrated in the present embodiment may be realized by a dedicated hardware, or may be realized by a program. When the information management unit 12 is realized by a program, the program is loaded into a memory of an apparatus and executed by a central processing unit (CPU) to realize the various operations disclosed in the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information management method comprising:

first creating at least an object property definition and an object service definition as an abstraction object disclosable to another apparatus, the object property definition being information concerning the own apparatus, the object service definition being information including information concerning a function;

receiving from the other apparatus at least any of an abstraction object that the other apparatus manages, data that complies with the abstraction object of the own apparatus, and a policy that defines an operating action and an operating condition of the abstraction object managed by the other apparatus;

applying the received policy to the own apparatus when an application condition is satisfied;

extracting a surrounding environment similar to a current situation from a history of the abstraction object created at the first creating;

second creating a candidate of policy with the extracted environment as the operating condition;

presenting the extracted environment to a user of the own apparatus to ask whether the candidate of policy is necessary;

applying the candidate of policy to the own apparatus when the candidate of policy is accepted by the user; and controlling operations of the own apparatus using at least any of the abstraction object created at the first creating and the applied policy, wherein the first creating includes changing the abstraction object of the own apparatus using the abstraction object of the other apparatus that has been acquired at the receiving.

2. A non-transitory computer readable storage medium having stored therein an information management program causing a computer to execute a process comprising:

first creating at least an object property definition and an object service definition as an object disclosable to another apparatuses, the object property definition being information concerning the own apparatus, the object service definition being information including information concerning a function;

receiving from the other apparatus at least any of an abstraction object that the other apparatus manages, data that complies with the abstraction object of the own apparatus, and a policy that defines an operating action and an operating condition of the abstraction object managed by the other apparatus;

applying the received policy to the own apparatus when an application condition is satisfied;

extracting a surrounding environment similar to a current situation from a history of the abstraction object created at the first creating;

second creating a candidate of policy with the extracted environment as the operating condition;

presenting the extracted environment to a user of the own apparatus to ask whether the candidate of policy is necessary;

applying the candidate of policy to the own apparatus when the candidate of policy is accepted by the user; and controlling operations of the own apparatus using at least any of the object created at the first creating and the applied policy, wherein the first creating includes changing the abstraction object of the own apparatus using the abstraction object of the other apparatus that has been acquired at the receiving.

3. An information management apparatus comprising:

a memory; and a processor coupled to the memory, wherein the processor executes a process comprising:

first managing at least an object property definition and an object service definition as an abstraction object disclosable to another apparatus, the object property definition being information concerning the own apparatus, the object service definition being information including information concerning a function;

receiving from the other apparatus at least any of an abstraction object that the other apparatus manages, data that complies with the abstraction object of the own apparatus, and a policy that defines an operating action and an operating condition of the abstraction object managed by the other apparatus;

applying the received policy to the own apparatus when an application condition is satisfied;

extracting a surrounding environment similar to a current situation from a history of the abstraction object managed at the first managing;

creating a candidate of policy with the extracted environment as the operating condition;

presenting the extracted environment to a user of the own apparatus to ask whether the candidate of policy is necessary;

applying the candidate of policy to the own apparatus when the candidate of policy is accepted by the user; and controlling operations of the own apparatus using at least any of the abstraction object that the own apparatus manages and the applied policy, wherein the first managing includes changing the abstraction object of the own apparatus using the abstraction object of the other apparatus that has been acquired at the receiving.

4. The information management apparatus according to claim 3, wherein the process comprises second managing a policy that has been received at the receiving or a policy that the own apparatus has created.

5. The information management apparatus according to claim 3, wherein the operating condition includes at least any of a state of a surrounding abstraction object, number of surrounding abstraction objects, time, and a location.

6. The information management apparatus according to claim 3, wherein the creating includes creating the policy from an operation that plurality of abstraction objects have in common.

* * * * *